(12) United States Patent
Verdoes et al.

(10) Patent No.: US 7,820,057 B2
(45) Date of Patent: Oct. 26, 2010

(54) METHOD FOR REMOVING AT LEAST ONE CONSTITUENT FROM A SOLUTION

(75) Inventors: Dirk Verdoes, Apeldoorn (NL); Johannes van der Meer, Loenen Aan de Vecht (NL); Earl Lawrence Vincent Goetheer, Westdorpe (NL)

(73) Assignee: Nederlandse Organisatie voor toegepastnatuurwetenschappelijk Onderzoek TNO, Delft (NL)

( * ) Notice: Subject to any disclaimer, the term of this patent is extended or adjusted under 35 U.S.C. 154(b) by 887 days.

(21) Appl. No.: 10/574,887

(22) PCT Filed: Oct. 8, 2004

(86) PCT No.: PCT/NL2004/000709

§ 371 (c)(1),
(2), (4) Date: Mar. 12, 2007

(87) PCT Pub. No.: WO2005/035104

PCT Pub. Date: Apr. 21, 2005

(65) Prior Publication Data

US 2007/0251884 A1    Nov. 1, 2007

(30) Foreign Application Priority Data

Oct. 10, 2003    (EP) .................................. 03078202

(51) Int. Cl.
*C02F 1/58*    (2006.01)
*C02F 1/62*    (2006.01)

(52) U.S. Cl. .................. 210/714; 23/301; 210/638; 210/639; 210/724; 210/727; 210/912

(58) Field of Classification Search .................. 210/714
See application file for complete search history.

(56) References Cited

U.S. PATENT DOCUMENTS

| 3,907,777 | A |   | 9/1975 | Nagasawa et al. |
| 4,014,787 | A | * | 3/1977 | Shorr .......................... 210/639 |
| 4,207,183 | A | * | 6/1980 | Herrigel ...................... 204/518 |
| 4,389,317 | A | * | 6/1983 | Trentelman et al. ......... 210/715 |

(Continued)

FOREIGN PATENT DOCUMENTS

DE    19527252 A1    1/1997

(Continued)

*Primary Examiner*—Peter A Hruskoci
(74) *Attorney, Agent, or Firm*—Hoffmann & Baron, LLP

(57) ABSTRACT

The invention relates to a method for removing at least one constituent from a solution, comprising:—forming a liquid mixture by bringing together said solution (1) and a particulate seed material (6) under conditions or in the presence of one or more substances which cause the constituent to be removed to crystallize out on the surface of the seed material; and—separating the seed material having the constituent to be removed crystallized out thereon from the liquid mixture by passing the liquid mixture through a filter (3), wherein the pore size of the filter (3) is greater than or equal to the particle size of the seed material (6). The invention also relates to a method for preparing a particulate material wherein use is made of the method according to the present invention. The invention also relates to the particulate material obtainable by this method. The invention further relates to an apparatus that can be used in the process of the present invention.

10 Claims, 3 Drawing Sheets

U.S. PATENT DOCUMENTS 4,429,535 A * 2/1984 Featherstone .............. 60/641.5
5,660,735 A * 8/1997 Coltrinari et al. ........... 210/723

FOREIGN PATENT DOCUMENTS

| GB | 1090822 | 11/1967 |
| WO | WO 79/01052 | 12/1979 |
| WO | WO 94/11309 | 5/1994 |

* cited by examiner

METHOD FOR REMOVING AT LEAST ONE CONSTITUENT FROM A SOLUTION

This application is the U.S. National Phase of, and Applicant claims priority from, International Application Number PCT/NL2004/000709 filed on 8 Oct. 2004, and European Application EP 03078202.3 filed on 10 Oct. 2003, both of which are incorporated herein by reference.

BACKGROUND OF THE INVENTION

The present invention relates to a method for removing at least one constituent from a solution, a method for preparing a particulate material, particulate material obtainable by said method, and an apparatus for removing at least one constituent from a solution.

It is known to use a so-called pellet reactor for removing at least one constituent from a solution. In that case, the solution is injected into the lowermost part of a cylindrical reactor vessel, and by maintaining a suitable flow of water through the reactor vessel seed particles are maintained in a fluidised bed. The topmost level of the fluidised bed is a few meters below the top of the reactor vessel. Near the underside of the fluidised bed, one or more chemicals are admixed to the solution, resulting in the solution becoming supersaturated with regard to a substance, which in part consists of the ion to be removed. The required counter-ion is present in the added stream of chemical(s) or is produced by a reaction of the waste stream with the added chemical(s). The substance consisting of the ion to be removed and the counter-ion crystallizes out on the surface of the particles of seed material, pellets being formed in the process. The intention is to avoid the birth of small precipitated particles in the bulk of the solution. Important aspects in doing so are the choice of a suitable seed material and control of the supersaturation by dosing said chemical(s). The particles of seed material must be maintained in a fluidised bed in order to prevent them from clotting together when said substance crystallizes out. The supersaturation, which forms the driving force for crystallization, is highest at the bottom of the reactor and goes to zero at the top of the reactor. The pellets at the bottom of the reactor will thus grow more quickly than the pellets at the top of the fluidised bed. The heavier pellets at the bottom of the reactor will remain there and, having reached a certain size, are removed continuously or periodically. At the same time, an identical number of fresh seed particles is added at the top of the fluidised bed in order to keep constant the concentration of the seed material.

Pellet reactors can be used, inter alia, for purifying waste water, softening water, removing heavy metal ions, removing phosphates from sewage and even for biological denitrification with the aid of bacteria.

When water is softened, a basic liquid or suspension (NaOH, Na2CO3 or Ca(OH)2) is fed in at the bottom of the reactor, the CO32-concentration increasing in the mixed solution and supersaturation of CaCO3 being achieved. The CO32-ions come from HCO3-ions in the water or from the base (in the case of adding Na2CO3). Removal of mercury, lead, copper, nickel, zinc, cadmium and other heavy metals can likewise be carried out by crystallizing out metal salts such as, for example, carbonates. When phosphates are removed, calcium phosphate or struphite crystallizes out on the particles of seed material.

Although the investment costs for a pellet reactor are low, and the grains obtained can sometimes be utilized (for example as an additive in/for chicken feed or for neutralizing acid) there are also considerable drawbacks associated with removing a constituent from a solution with the aid of a pellet reactor. Thus the treated liquid (for example decalcified water) requires secondary treatment because it still contains small solid particles. This secondary treatment may, for example, consist of the treated liquid being passed through an anthracite-sand filter. One cause of the presence of the small loose particles in the effluent is the erosion of the seed material and/or the pellets due to the strong turbulence, required for optimum mixing, in the pellet reactor. Another cause is the formation of homogeneous, loose, small CaCO3 crystals (microcrystals) due to local high supersaturation in the bulk of the solution.

A second drawback of using the known pellet reactor is the fact that the specific area of the seed grains (that is the area for crystallization) is low, because the seed grains, in order to prevent them from being flushed out, must not be too small (for example, they have a diameter of 0.6 mm, corresponding to a specific area of 3.8 m2 per kg).

The rate of crystallization depends, inter alia, on the crystallization area present. A low specific area means that a relatively large amount of seed material must be added, and therefore also that the reactor, in order to achieve a certain capacity, must have a relatively large content.

In order to maintain the fluidised bed, an essentially constant flow rate must be maintained, so that the flexibility with regard to flow rate fluctuations is very limited, because this would lead directly to settling or, as the case may be, flushing out of the fluidised particles. This also means that the residence time in a pellet reactor, and thus the reaction/crystallization time, is a quantity, which virtually cannot be varied.

In order to overcome these drawbacks the method as described in WO 94/11309 was developed. In this method use is made of seed material having a particle size of between 0.1 and 50 μm, whereby the mixture of liquid and seed material having substance crystallized out thereon is passed through a membrane filter for microfiltration, which filter has such a pore size between 30 nm and 25 μm that the liquid does and the seed material does not permeate through the membrane. In other words, said method requires that the pore size of the membrane filter is smaller than the particle size of the seed material to establish a good separation of the seed material.

The very small seed particles used in accordance with this method have a high specific area, so that the same seed mass provides more crystallization area. Moreover, the diffusion distances are shorter. Consequently, crystallization can take place much more rapidly, as a result of which the apparatus can be much smaller (for example by a factor of 10 or more). For the same crystallization area, much (more than one order of magnitude) less seed material is required. The outgrown seeds formed are smaller and as a result can be applied in more ways, for example as a filler. The outgrown seeds are much less contaminated with the seed material. In the conventional pellet reactor, from 15 to 30% of the pellets consists of seed material, if the method according to the invention is employed, this percentage is, for example, only 0.2%.

Moreover, when using the cited method a secondary treatment of the liquid in an anthracite-sand filter or the like, to remove microcrystals, is no longer necessary. In the case of treatment of water, the use of the microfiltration membrane according to WO 94/11309 also makes it possible to remove viruses and bacteria, as a result of which, in addition to softening or, as the case may be, the removal of metal, disinfection takes place at the same time.

A wider scope is available for tailoring the type of the seed material to the desired result, in particular with regards to improved interaction with the substance to be crystallized out.

In addition, because no use is made of a fluidised bed, and thus it is not necessary to allow for minimum and maximum flow velocities to maintain a fluidised bed, the method according to WO 94/11309 provides much wider choice with respect to the liquid flow rate and the residence time (reaction time) to be employed. In general, the smaller equipment will result in low total investment costs.

It will be clear that the method of WO 94/11309 constitutes a considerable improvement over the known processes wherein use is made of a pellet reactor. Nonetheless, in practice it is felt that the method as described in WO 94/11309 leaves room for improvement.

It has now surprisingly been found that an improved method can be provided in which use is made of a filter having a pore size that is greater or equal to the particle size of the seed material.

Accordingly, the present invention relates to a method for removing at least one constituent from a solution, comprising:

forming a liquid mixture by bringing together said solution and a particulate seed material under conditions or in the presence of one or more substances which cause the constituent to be removed to crystallize out on the surface of the seed material; and separating the seed material having the constituent to be removed crystallized out thereon from the liquid mixture by passing the liquid mixture through a filter, wherein the pore size of the filter is greater than or equal to the particle size of the seed material.

In accordance with the present invention a highly effective removal of constituent from the liquid mixture is established, whereas at the same time it is economically much more attractive than the process known from WO 94/11309. This finding is highly surprising since it was until now believed that an effective removal of constituents would by definition require the particle size of the seed material to be greater than the pore size of the filter.

According to the present invention a more simple and more cost-effective solid-liquid separation can be established. Additionally, smaller equipment can be used, and higher throughputs can be established due to use of filters having greater pore sizes, the latter having the advantage that they are less expensive than previously applied membrane filters.

Preferably, the particle size of the seed material is from 0.1 to 50 μm, and more preferably from 5 to 25 μm.

The pore size of the filter to be used in the process according to the present invention can be up to 150 μm. Preferably, the pore size of the filter is from 5 to 100 μm, and more preferably from 15 to 75 μm. The filter can suitably be made of cloth or gauze. Such filters are much less expensive than the membrane filters as for instance used in the process of WO 94/11309.

In accordance with the present invention conditions can be applied or one or more substances can be present that cause the constituent to be removed to crystallize out on the surface of the seed material. Crystallization can for instance be established by cooling the liquid mixture to a temperature in the range of −50 to 200° C., preferably −20 to 80° C. Alternatively, crystallization can be brought about by allowing the liquid mixture to evaporate. This can suitably be established by warming the liquid mixture at a temperature of −50 to 200° C., preferably 0 to 100° C.

Preferably, the crystallization is established by means of one or more substances present in the liquid mixture. Suitable examples of such substances include NaOH, Ca(OH)2 and Na2 S.

The seed material may in principle consist of any type of material allowing the constituent to be removed to crystallize out on its surface. One or more types of seed material may be used. Preferably, one particular type of seed material is used. The seed materials can be inorganic materials such as mineral clay types such as bentonite, silica particles, silicates and diatomes. Examples of organic seed materials that can suitably be used in the method of the present invention include cellulose, stearate, lactose, starch, maltodextrin, guar gum, xantham gum, hydroxypropyl cellulose, microcrystalline cellulose, silicified cellulose, croscarmellose sodium. Preferred organic seed materials include cellulose, stearate, lactose.

The method according to the present invention can suitably be used to prepare particles with a distinct morphology, size distribution and polymorphology.

Preferably, the solution to be applied in the present method is water or an aqueous solution.

The method according to the present invention can suitably be used to soften water. In such water softening method the pH of the solution is being increased to cause CaCO3 to precipitate on the seed material. The water to be softened may be drinking-water or waste water from industry, for instance waste water from the paper and cardboard industry.

The method in accordance with the present invention can also suitably be used to remove heavy metal ions from the solution. In such method the corresponding heavy metal salt or heavy metal hydroxide is crystallized out on the surface of the seed material. Such metal salt could be carbonate, sulphide, phosphate, sulphate, fluoride, chromate, hydroxycarbonate and the like.

In yet another embodiment of the present invention the method is used to remove anions from the solution, whereby a salt of the anions is crystallized out on the surface of the seed material. Such anions could, for example, fluorides, phosphates and sulphates. In accordance with such a method fluorides can for instance be recovered from waste water that is produced in the electronics industry.

The present invention also relates to a method for preparing a particulate material, wherein use is made the method according to the present invention as described hereabove. Accordingly, the present invention also provides a method for preparing a particulate material which comprises a particulate seed material and at least one constituent that crystallized out on the surface of the seed material, which method comprises the steps of:

forming a liquid mixture by bringing together a solution that contains at least one constituent and a particulate seed material under conditions or in the presence of one or more substances which cause the constituent to crystallize out on the surface of the seed material; and separating the particulate material from the liquid mixture by passing the liquid mixture through a filter, wherein the pore size of the filter is greater than or equal to the particle size of the seed material.

Such particulate material has unique morphological properties. Not only the particle size distribution (e.g. large particle in stead of small particles which are normally formed) can be tuned but also the shape of the precipitated material (eg spherical particles in stead of elongated particles) can be controlled by the addition of heterogeneous seed material. Hence, the inventions also relates to a particulate material obtainable by such a method. In a preferred embodiment such particulate material comprises only one polymorph. In this way, particulate materials can be prepared that can for instance suitably be used in the preparation of pharmaceuticals.

The method in accordance with the present invention can be carried out in conventional crystallisation equipment such as, for instance, continuous stirred tank reactor. Alternatively, the method can be carried out in a tube that is provided with a static mixer.

An additional advantage of the present invention is that the crystallization reactor to be used can be integrated with the solid-liquid separation, enabling a further reduction in the size of the equipment to be used.

Accordingly, the present invention also relates to an apparatus for removing at least one constituent from a solution comprising a vessel, one or more filters that are located inside the vessel, at least one inlet for introducing a liquid mixture which comprises the solution from which the constituent needs to be removed, a particulate seed material on the surface of which the constituent to be removed will crystallize out and optionally one or more substances that cause the constituent to be removed to crystallize out on the surface of the seed material, at least one outlet for discharging the solution from which the constituent is removed which outlet(s) is (are) connected to the one or more filters, and an outlet for withdrawing seed material having the constituent to be removed crystallized out thereon.

Preferably, the apparatus according to the present invention comprises a mixing zone in which the liquid mixture is allowed to be formed from its respective components which mixing zone is arranged upstream the vessel. Preferably, the mixing zone forms part of the inlet for introducing the liquid mixture, whereby in said inlet a static mixer has been arranged. Preferably, the outlet for withdrawing seed material is connected to the mixing zone to allow seed material to be recycled. In another preferred embodiment an inlet for introducing the one or more substances is connected to the mixing zone.

BRIEF DESCRIPTION OF THE DRAWINGS

FIG. 1 shows a process scheme for softening water with seed material and a filter according to the present invention.

FIG. 2 shows a process scheme for softening water wherein the crystallization reactor is integrated with the solid-liquid separation.

FIG. 3 shows a filtration assisted crystallization technology set-up that can be used, for example, to soften and filter wastewater from the paper and pulp industry.

DETAILED DESCRIPTION OF THE INVENTION

Figure 1:
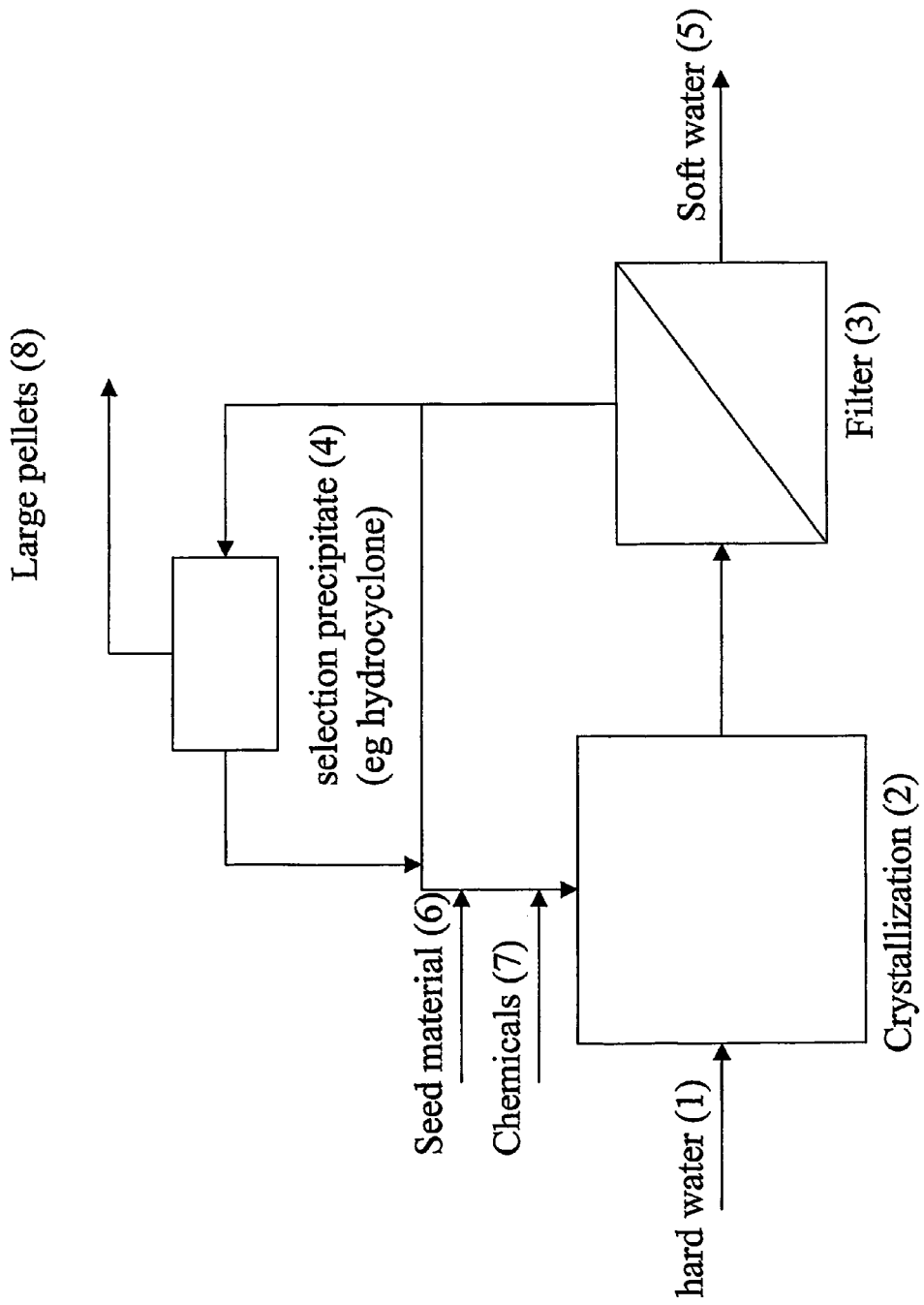
In FIGS. 1-3 equipment has schematically been shown in which the method of the present invention can be carried out.

The set-up depicted in FIG. 1 consists of a crystallization and a filtration section. The set-up can be expanded with a precipitate selection unit. The crystallization section consists of a continuous stirred tank reactor (2), various pumps and two reservoirs for, respectively, the stream containing the constituent to be removed (1), and the substances to be added to this stream (6,7), which cause the constituent to be removed to crystallize out on the seed material. In the filtration section a solid/liquid separation is performed by the use of a filter (3). The permeate consists of a solution without solid particles and with a much lower concentration of the constituent which is removed by crystallization (5).

The solid particles can be removed either continuously or discontinuously from the filtration unit. The solid particles can be removed as a slurry or as a dry filter cake. The solid particles can be reused as seed material to promote crystallization of the constituent. In e.g. a hydrocyclone (4) a selection can be made in solid particles, which is desirable to reuse as a seed material, and in solid particles, which are not desirable for reuse in this process (8).

Figure 2:
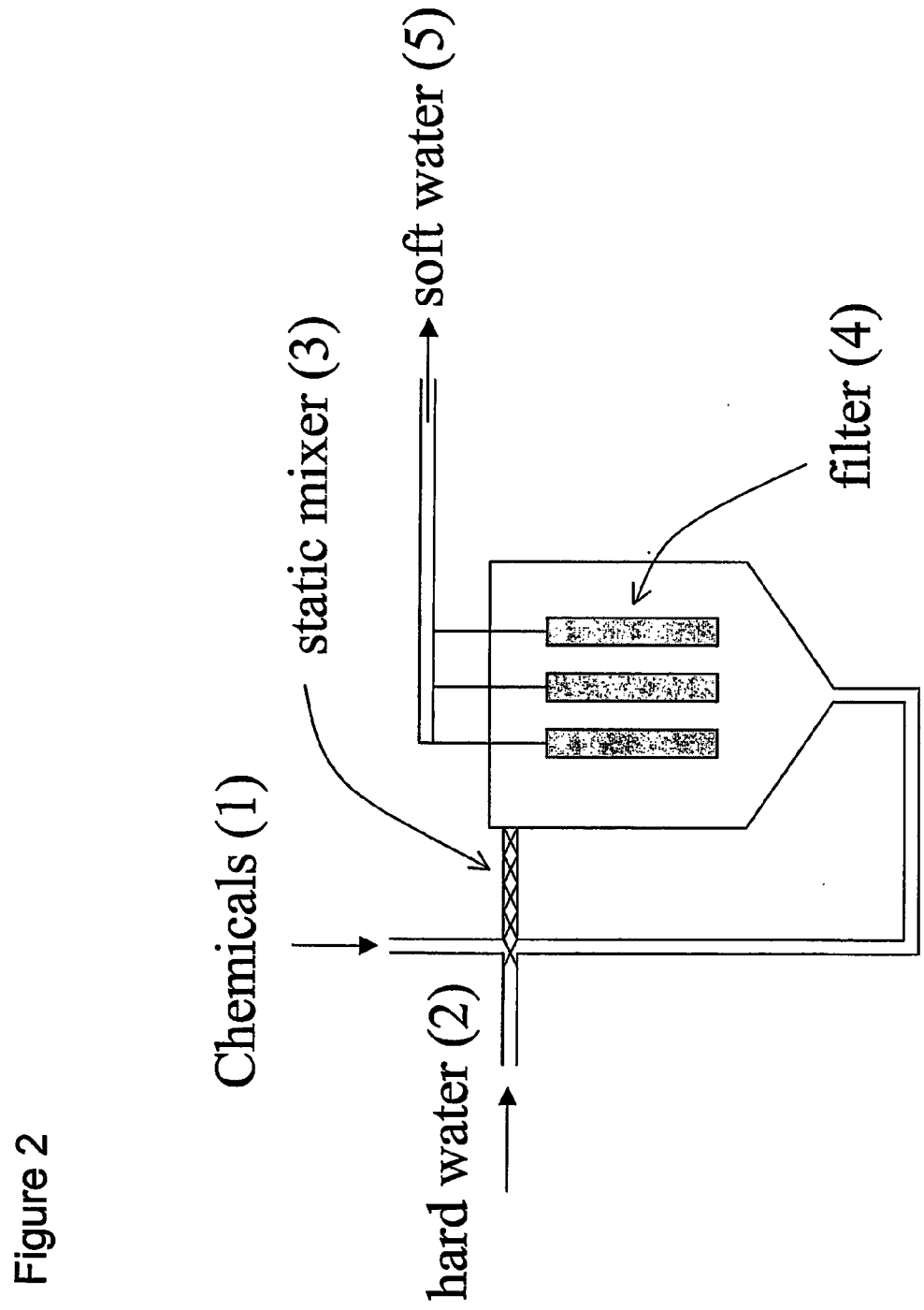

The set-up depicted in FIG. 2 shows the integration of the crystallization section with the filtration section. The liquid phase with the constituent (2), which has to be removed, is thoroughly mixed with substances (1), which cause the constituent to be removed to crystallize out on the seed material. This mixing can be performed by using for example a static mixer (3). This mixed-solution is pumped directly in a filter unit (4). The permeate (5) consists of a solution without solid particles and with a much lower concentration of the constituent which is removed by crystallization. The particles are periodically removed from the filter. By gravitation the removed particles are allowed to settle down in the bottom section of the filter and from there it is pumped towards the static mixer as a seed material for the crystallization of the constituent, which has to be removed. In the case that the formed particles are too large these are removed from the process and new seed material is added to the process.

EXAMPLES

Example 1

Figure 3:
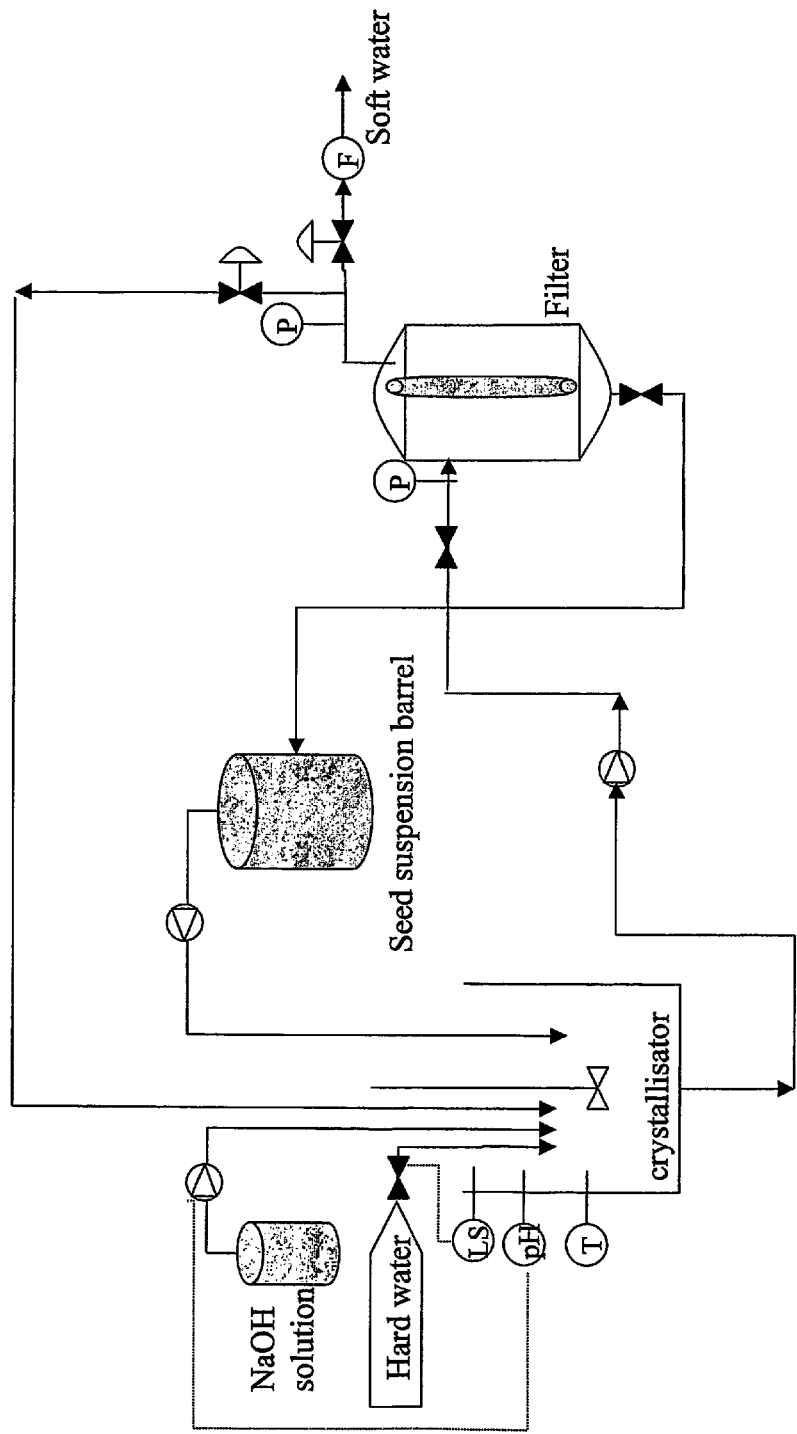

In this example groundwater was softened using the filtration assisted crystallization technology. The set-up is depicted in FIG. 3. The seed material used comprised calcium silicate particles having a mean diameter of 15 μm. The size of the crystallisator was 160 L. The pH in the crystallisator was adjusted to a pH of 8.6 by using a caustic soda solution (1 M). Also seed material was pumped as a slurry into the crystallisator (1 gram of seed material per liter hard water). From the crystallisator the now softened water with the crystallized calcium carbonate on the seed material is pumped with a constant flow (800 l/hour) to a pulse tube filter (the average pore size of the cloth filter was 60 μm). In this case a constant filtration flux was obtained of 4 m3 per m2 filter surface area per hour. After 4 hours the filtration was stopped and the cake was removed as a slurry from the filter. The removed cake was used in the next cycle as seed material. The conditions of the second cycle were identical to the conditions in the first cycle. After the second cycle the filter cake was again used after removal from the filter apparatus as a seed material for the third cycle. In total 10 cycles have been performed with recycling of the seed material. In Table 1 an overview is given of the analytical results of the influent and effluent for the first and last cycle.

Example 2

In this example waste water from the paper and the pulp industry was softened using the filtration assisted crystallization technology. The set-up is depicted in FIG. 3. The seed material used comprised calcium silicate particles having a mean diameter of 15 μm. The size of the crystallisator was 160 L. The pH in the crystallisator was adjusted to a pH of 8.3 by using a caustic soda solution (5 M). Also seed material was pumped as a slurry into the crystallisator (1 gram of seed material per liter hard water). From the crystallisator the now softened water with the crystallized calcium carbonate on the seed material is pumped with a constant flow (800 l/hour) to a pulse tube filter (the average pore size of the cloth filter was 60 μm). In this case a constant filtration flux was obtained of 4 m3 per m2 filter surface area per hour. After 4 hours the filtration was stopped and the cake was removed as a slurry from the filter. The removed cake was used in the next cycle as seed material. The conditions of the second cycle were identical to the conditions in the first cycle. After the second cycle the filter cake was again used after removal from the filter apparatus as a seed material for the third cycle. In total 6 cycles have been performed with recycling of the seed material. In Table 2 an overview is given of the analytical results of the influent and effluent for the first and last cycle.

Example 3

In this example waste water from the paper and the pulp industry was softened and filtered with a wire gauze filter. The set-up is depicted in FIG. 3. The seed material used comprised calcium silicate particles having a mean diameter of 15 μm. The size of the crystallisator was 160 L. The pH in the crystallisator was adjusted to a pH of 8.3 by using a caustic soda solution (5 M). Also seed material was pumped as a slurry into the crystallisator (1 gram of seed material per liter hard water). From the crystallisator the now softened water with the crystallized calcium carbonate on the seed material is pumped with a constant flow (400 l/hour) to a filter (the average pore size of the cloth filter was 60 μm). In this case a constant filtration flux was obtained of 2.5 m3 per m2 filter surface area per hour. After 3 hours the filtration was stopped and the cake was removed as a slurry from the filter. The removed cake was used in the next cycle as seed material. The conditions of the second cycle were identical to the conditions in the first cycle. After the second cycle the filter cake was again used after removal from the filter apparatus as a seed material for the third cycle, and so on. In total 6 cycles have been performed with recycling of the seed material. In Table 3 an overview is given of the analytical results of the influent and effluent for the first and last cycle.

TABLE 1

Softening of ground water

|  |  | Influent | Effluent (1$^{st}$ cycle) | Effluent (10$^{th}$ cycle) |
|---|---|---|---|---|
| Calcium | mg/l | 140 | 19 | 16 |
| Magnesium | mg/l | 12 | 11 | 11 |
| Total hardness | mmol/l | 4 | 0.94 | 0.83 |

TABLE 2

Composition waste water from the paper- and pulpindustry before and after water softening

|  |  | Influent (1$^{st}$ cycle) | Effluent (1$^{th}$ cycle) | Influent (6$^{st}$ cycle) | Effluent (6$^{th}$ cycle) |
|---|---|---|---|---|---|
| CZV | mg/l | 93 | 69 | 93 | 80 |
| BZV | mg/l | 4 | 2 | 4 | 1 |
| Kj-N | mg/l | 4.1 | 4.2 | 3.6 | 2.9 |
| P-PO4 | mg/l | 0.6 | 0.16 | 1.01 | 0.2 |
| Sulphate | mg/l | 130 | 129 | 133 | 136 |
| Chloride | mg/l | 122 | 119 | 120 | 120 |
| Nitrate | mg/l | 0 | 0 | 0 | 0 |
| Sodium | mg/l | 148.4 | 308.9 | 138.4 | 312 |
| Potassium | mg/l | 16.5 | 17.1 | 16 | 17.4 |
| Magnesium | mg/l | 16.4 | 12 | 15.3 | 10.5 |
| Calcium | mg/l | 390.5 | 85.5 | 373.2 | 36.3 |
| Zinc | μg/l | 17.2 | 20.2 | 14.7 | 17.2 |
| Nickel | μg/l | ND | ND | 7.4 | 7.2 |

ND: not determined

TABLE 3

Composition waste water from the paper- and pulpindustry before and after water softening

|  | Na (mg/l) | K (mg/l) | Mg (mg/l) | Ca (mg/l) |
|---|---|---|---|---|
| influent | 115.8 | 33.6 | 15.0 | 352.3 |
| Cycle 1 | 238 | 18.5 | 9.5 | 67.6 |
| Cycle 3 | 237.7 | 16.8 | 6.8 | 45.5 |
| Cycle 6 | 254.5 | 19.3 | 9.8 | 88.6 |

The invention claimed is:

1. A method for removing at least one constituent from a solution comprising:
   i. forming a liquid mixture by bringing together said solution and a heterogenous particulate seed material under conditions or in the presence of one or more substances which cause the constituent to be removed to crystallize out on the surface of the seed material; and
   ii. separating the seed material having the constituent to be removed crystallized out thereon from the liquid mixture by passing the liquid mixture through a filter and a filter cake, wherein the pore size of the filter is greater than the particle size of the seed material, and wherein the particle size of the seed material is from 5 to 50 μm, and the pore size of the filter is greater than 50 μm and equal to or less than 150 μm.

2. The method according to claim 1, wherein the particle size of the seed material is from 5 to 25 μm.

3. The method according to claim 1, wherein one or more substances cause the constituent to be removed to crystallize out on the surface of the seed material.

4. The method according to claim 1, wherein the seed material comprises an inorganic material selected from the group consisting of a mineral clay types, silica particles, silicates or diatomes.

5. The method according to claim 1, wherein the seed material comprises an organic material selected from the group consisting of cellulose, stearate and lactose.

6. The method according to claim 1, which method is used to prepare particles with a distinct morphology, size distribution and polymorphology.

7. The method according to claim 1, wherein the solution is water or an aqueous solution.

8. The method according to claim 7, which method is used to soften water and wherein the pH of the solution is being increased to cause $CaCO_3$ to precipitate on the seed material.

9. The method according to claim 1, which method is used to remove heavy metal ions from the solution by way of crystallizing out metal salt or metal hydroxide on the surface of the seed material.

10. The method according to claim 1, which method is used to remove anions from the solution by way of crystallizing out a salt of the anions on the surface of the seed material.

* * * * *

UNITED STATES PATENT AND TRADEMARK OFFICE
CERTIFICATE OF CORRECTION

PATENT NO.      : 7,820,057 B2
APPLICATION NO. : 10/574887
DATED           : October 26, 2010
INVENTOR(S)     : Verdoes et al.

It is certified that error appears in the above-identified patent and that said Letters Patent is hereby corrected as shown below:

ON THE COVER PAGE:

Item [73] Assignee:

Now reads: "Nederlandse Organisatie voor toegepastnatuurwetenschappelijk onderzoek TNO"

Should read: --Nederlandse Organisatie voor toegepast- natuurwetenschappelijk onderzoek TNO --

Signed and Sealed this
Eleventh Day of January, 2011

David J. Kappos
*Director of the United States Patent and Trademark Office*